United States Patent [19]
Takagi

[11] Patent Number: 5,218,397
[45] Date of Patent: Jun. 8, 1993

[54] AUTOMATIC EXPOSURE CONTROL APPARATUS FOR A CAMERA

[75] Inventor: Tadao Takagi, Yokohama, Japan

[73] Assignee: Nikon Corporation, Tokyo, Japan

[21] Appl. No.: 772,444

[22] Filed: Oct. 7, 1991

[30] Foreign Application Priority Data

Oct. 16, 1990 [JP] Japan ................................. 2-275201

[51] Int. Cl.$^5$ ...................... G03B 7/099; G03B 7/00
[52] U.S. Cl. ................................. 354/415; 354/480
[58] Field of Search ............................. 354/415, 480

[56] References Cited

U.S. PATENT DOCUMENTS

| | | | |
|---|---|---|---|
| 4,303,318 | 12/1981 | Kitaura et al. | 354/24 |
| 4,343,541 | 8/1982 | Mizokami | 354/51 |
| 4,422,743 | 12/1983 | Izumi et al. | 354/415 |
| 4,460,262 | 7/1984 | Mizokami | 354/48 X |
| 4,477,170 | 10/1984 | Yamada et al. | 354/415 |

FOREIGN PATENT DOCUMENTS 3034035 3/1981 Fed. Rep. of Germany .
57-4027 3/1982 Japan .

*Primary Examiner*—Michael L. Gellner
*Assistant Examiner*—Jae N. Noh
*Attorney, Agent, or Firm*—Shapiro and Shapiro

[57] ABSTRACT

An automatic exposure control apparatus for a camera for metering a reflected light from a film surface in a flash photographing mode and stopping a light emission in accordance with the comparison comprises a flashing device for providing a preliminary light emission, an early main light emission and a late main light emission, a flashing control unit for controlling the flashing device to provide the preliminary light emission in a closed state of a shutter curtain and providing the early main light emission and the late main light emission in sequence after the shutter curtain has been opened, a metering unit for metering a reflected light from the shutter curtain surface at the preliminary light emission and metering a reflected light from the film surface at the early main light emission and the late main light emission, and an exposure control unit for comparing a metering output of the metering device for the preliminary light emission and a metering output for the early main light emission, determining an exposure condition in accordance with the comparison and stopping the late main light emission after the start of the late main light emission in accordance with the exposure condition.

9 Claims, 11 Drawing Sheets

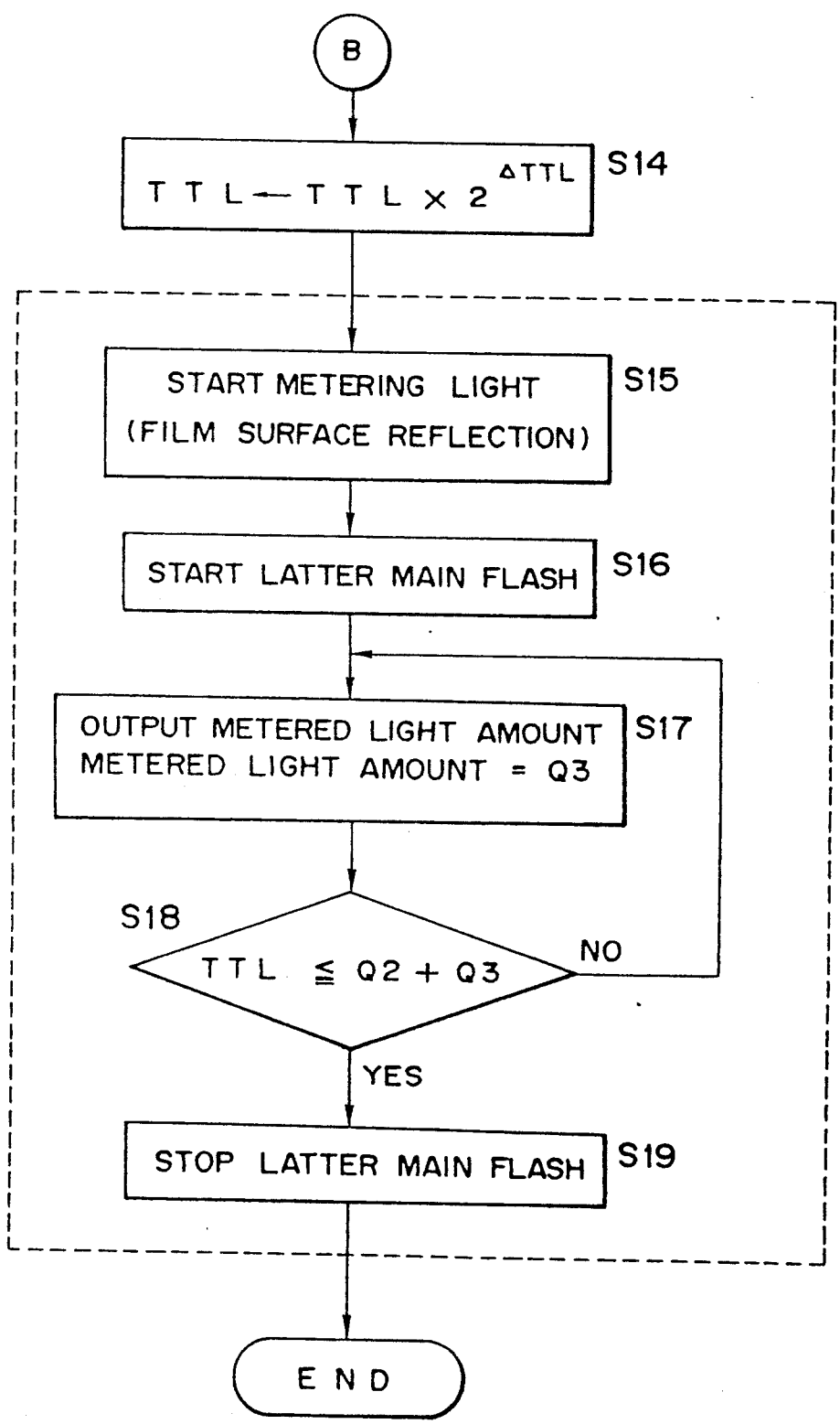

AUTOMATIC EXPOSURE CONTROL APPARATUS FOR A CAMERA

BACKGROUND OF THE INVENTION

1. Field of the Invention

The present invention relates to an automatic exposure control apparatus for a camera which meters a reflected light from a film surface in a flash photographing mode and stops light emission in accordance with the metering.

2. Related Background Art

A camera which detects a reflected light from a film surface after a shutter has been opened in a steady state light photographing mode to meter a light intensity and which closes the shutter when the metering output reaches a predetermined level has been known. Further, a camera which emits a flashing light by an electronic flashing device after the shutter has been opened, detects a reflected light from the film surface to meter a light intensity, and stops the light emission when the metering output reaches a predetermined level has also been known.

A reflective index of the film surface varies from film to film and the metering output for the reflected light varies with the reflective index. Thus, if the closure of the shutter or the termination of the light emission is controlled under the same condition without taking the reflective index of the film into account, under-exposure or over-exposure may result in depending on the film. Japanese Laid-Open Patent Application No. 57-4027 discloses a camera which intends to avoid such a problem. In the reference, a metering output (first metering output) in a shutter closure state and a metering output in a shutter partially open state (second metering output) are compared to determine a difference therebetween (which depends on a difference between reflective indices of a shutter curtain surface and a film surface), and a timing to close the shutter is determined while such a difference is taken into account. In this method, proper exposure is always attained in the steady state light photographing mode without regard to variation in the reflective index of the film plane.

Such a prior art method is effective in determining the timing to close the shutter in the steady state light photographing mode, but it is not proper in determining a timing to stop the light emission in the flash photographing mode. In the steady state light, the light intensity can be deemed as essentially constant with time as shown in FIG. 1A and the first metering output and the second metering output can be obtained under the same condition. By contrast, the light intensity in the flash light emission varies with time as shown in FIG. 1B. As will be appreciated from FIG. 1B, even if a first metering output and a second metering output are both obtained during the flash they cannot be compared under the same condition, and the difference between the reflective indices of the film surface and the shutter curtain surface cannot be determined.

SUMMARY OF THE INVENTION

It is an object of the present invention to provide an automatic exposure control apparatus for a camera which permits proper exposure without regard to variation in a reflective index of a film surface in a flash photographing mode.

Referring to FIG. 2A, the automatic exposure control apparatus for the camera of the present invention comprises a flashing device 101 for providing a preliminary light emission, an early main light emission and a late main light emission, a flashing control unit 102 for controlling the flashing device 101 to provide the preliminary light emission in a closed state of a shutter curtain and provide the early main light emission and the late main light emission in sequence after the shutter curtain has been opened, a metering unit 103 for metering a reflected light from the shutter curtain surface at the preliminary light emission and metering a reflected light from the film surface at the early main light emission and the late main light emission, and an exposure control unit 104 for comparing a metering output of the metering unit 103 at the preliminary light emission and the metering output at the early main light emission to determine a predetermined exposure condition in accordance with the comparison and stopping the late main light emission in accordance with the exposure condition after the late main light emission has been started.

The exposure control unit 104 compares the metering output of the metering device 103 at the preliminary light emission by the flashing device 101 and the metering output at the early main light emission and determines a predetermined exposure condition in accordance with the comparison. Since the metering output at the preliminary light emission and the metering output at the early main light emission can be compared under the same condition, the correct exposure condition can be determined by the comparison of the both metering outputs. The exposure control unit 104 stops the late main light emission after the start of the late main light emission in accordance with the exposure condition.

Another embodiment shown in FIG. 2B comprises a flashing device 101, a flashing control unit 102, a metering unit 103, a determination unit 201 for comparing a metering output of the metering unit 103 at the preliminary light emission and a metering output at the early main light emission and determining an exposure level to stop the late main light emission in accordance with the comparison, and an exposure unit 202 for stopping the late main light emission after the start of the late main light emission when a sum metering output of the metering output for the early main light emission and the metering output for the late main light emission reaches the determined exposure level.

The determination unit 201 compares the metering output for the preliminary light emission and the metering output for the early main light emission and determines the exposure level to stop the late main light emission in accordance with the comparison. After the late main light emission has been started, the exposure unit 202 stops the late main light emission when the sum metering output of the metering output for the early main light emission and the metering output for the late main light emission reaches the exposure level.

A further embodiment also depicted by FIG. 2B, comprises a flashing device 101, a flashing control unit 102, a metering unit 103, a determination unit 301 for comparing a metering output of the metering unit 103 for the preliminary light emission and a metering output for the early main light emission and determining a gain to correct a sum metering output of the metering output for the early main light emission and the metering output for the late main light emission in accordance with the comparison, and an exposure unit 302 for stopping the late main light emission after the start of the main light emission when the sum metering output corrected by the determined gain reaches a predetermined exposure level.

The determination unit 301 compares the metering output of the metering unit 103 at the preliminary light emission and the metering output at the early main light emission and determines the gain to correct the sum metering output of the metering output for the early main light emission and the metering output for the late main light emission in accordance with the comparison. After the late main light emission has been started, the exposure unit 302 stops the late main light emission when the sum metering output corrected by the determined gain reaches the predetermined exposure level.

BRIEF DESCRIPTION OF THE DRAWINGS

FIGS. 3 to 6 show one embodiment of the present invention in which;

FIG. 3 shows a side sectional view of a camera,

FIG. 4 shows a block diagram of the automatic exposure control apparatus for the camera in accordance with the present invention, FIG. 6 shows a timing chart of a light emission timing, and FIGS. 7A to 7C show flow charts of another embodiment.

DETAILED DESCRIPTION OF THE PREFERRED EMBODIMENTS

One embodiment of the present invention is now explained with reference to FIGS. 3 to 6.

Figure 1A:
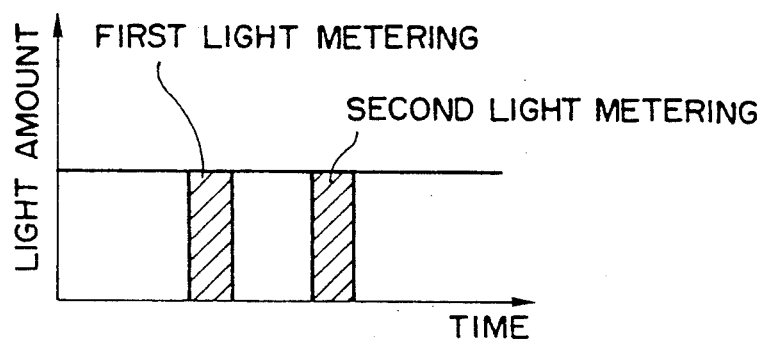
FIGS. 1A and 1B illustrate a problem encountered in the prior art.
Figure 1B:
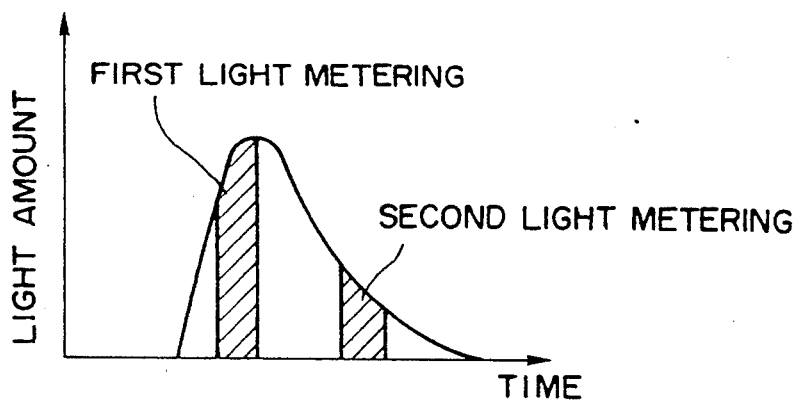
Figure 2A:
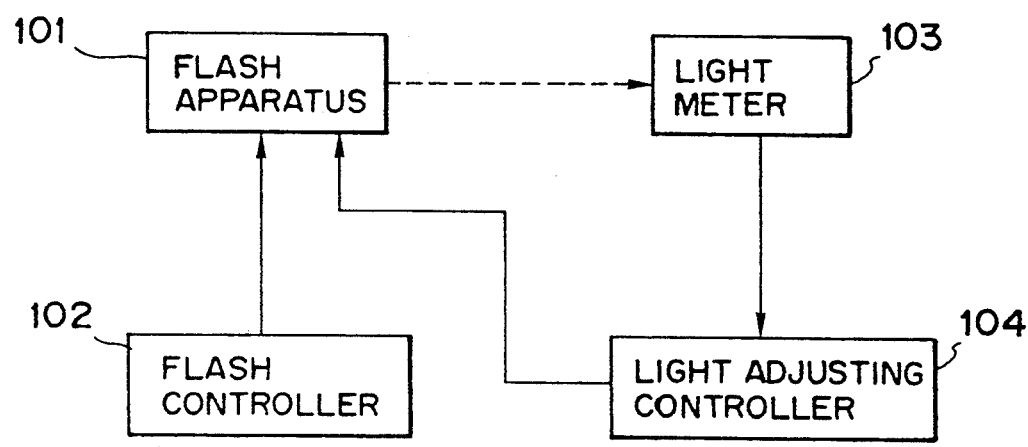
FIGS. 2A and 2B show schematic views of an automatic exposure control apparatus for a camera of the present invention.
Figure 2B:
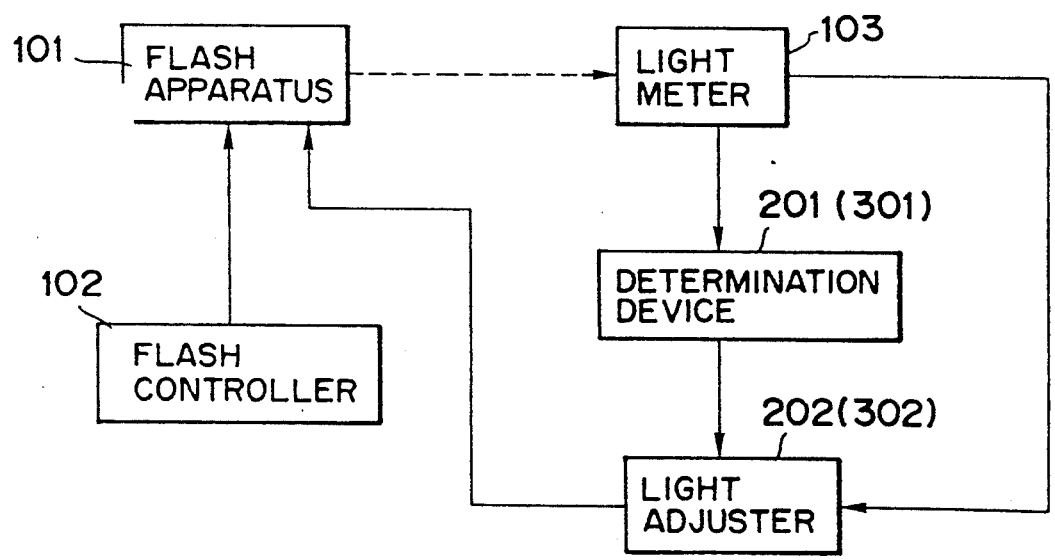
Figure 3:
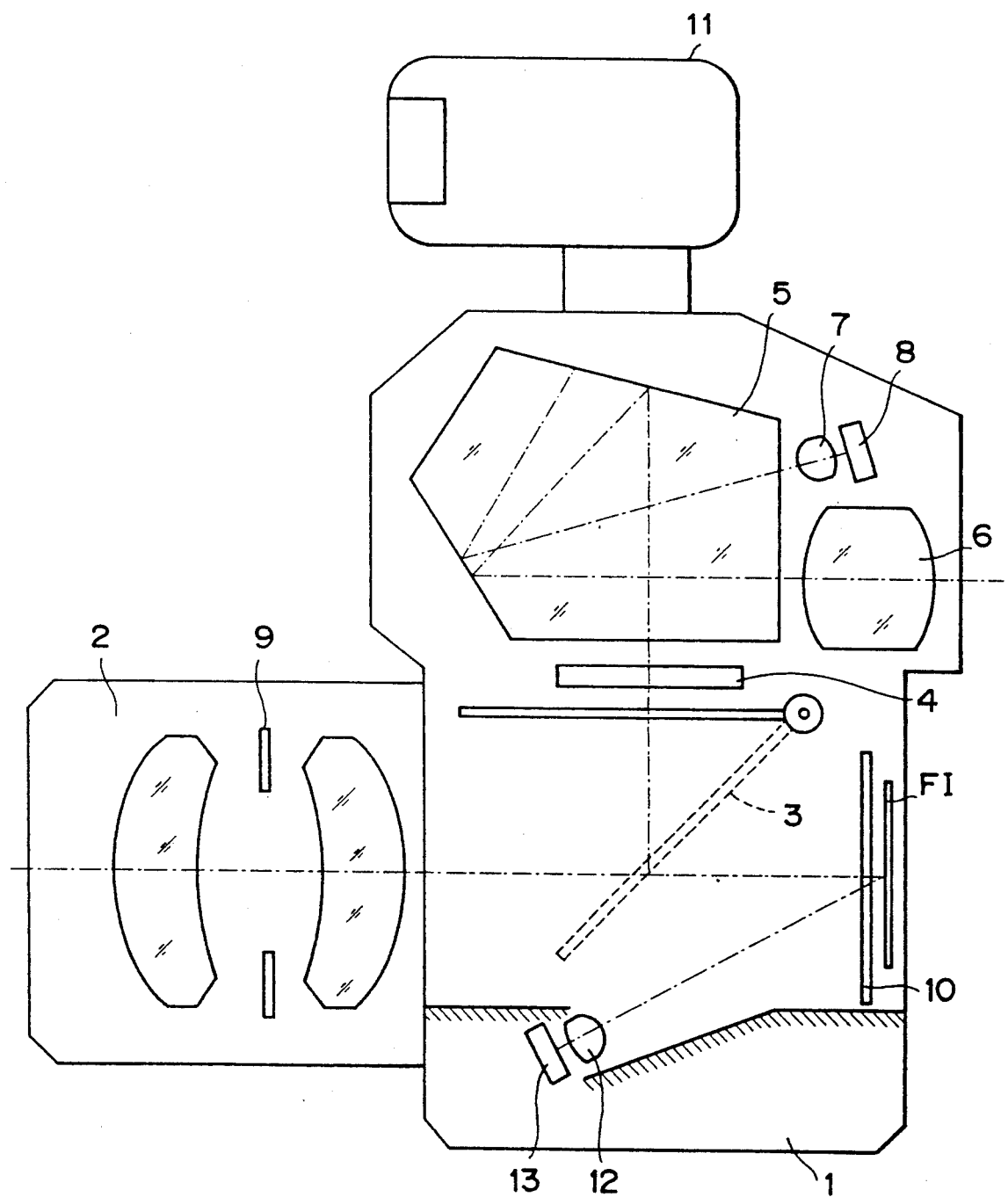

FIG. 3 shows a configuration of a TTL automatic exposure control camera.

A light beam (steady state light) transmitted through a photographing lens 2 is reflected by a mirror 3 which is in a down position shown by broken lines, passes through a screen 4 and a penta-prism 5, and a portion thereof is directed to an eyepiece lens 6 while other portion thereof passes through a condenser lens 7 and is directed to a metering device 8 for metering the steady state light. When a release button 32 (FIG. 4) is depressed, the mirror 3 is driven to an up position shown by solid lines, an iris 9 is closed and a shutter 10 is opened so that object light transmitted through the photographing lens 2 is directed, to a film FI to expose the film FI to the light.

In a flash photographing mode, an electronic flash device 11 provides an early main light emission after the shutter 10 has been fully opened and provides a late main light emission a predetermined time thereafter. The object is illuminated by the early and late main light emissions and the reflected light from the object passes through the photographing lens 2 and reaches the film surface of the film FI so that the film surface is exposed. The reflected light from the film surface is detected by the metering device 13 through the condenser lens 12. In the camera of the present embodiment, a preliminary light emission is provided prior to the early main light emission. The preliminary light emission is provided before the shutter 10 is opened, and the reflected light from the object is reflected by a curtain surface of the shutter 10 and also detected by the metering device 13.

Figure 4:
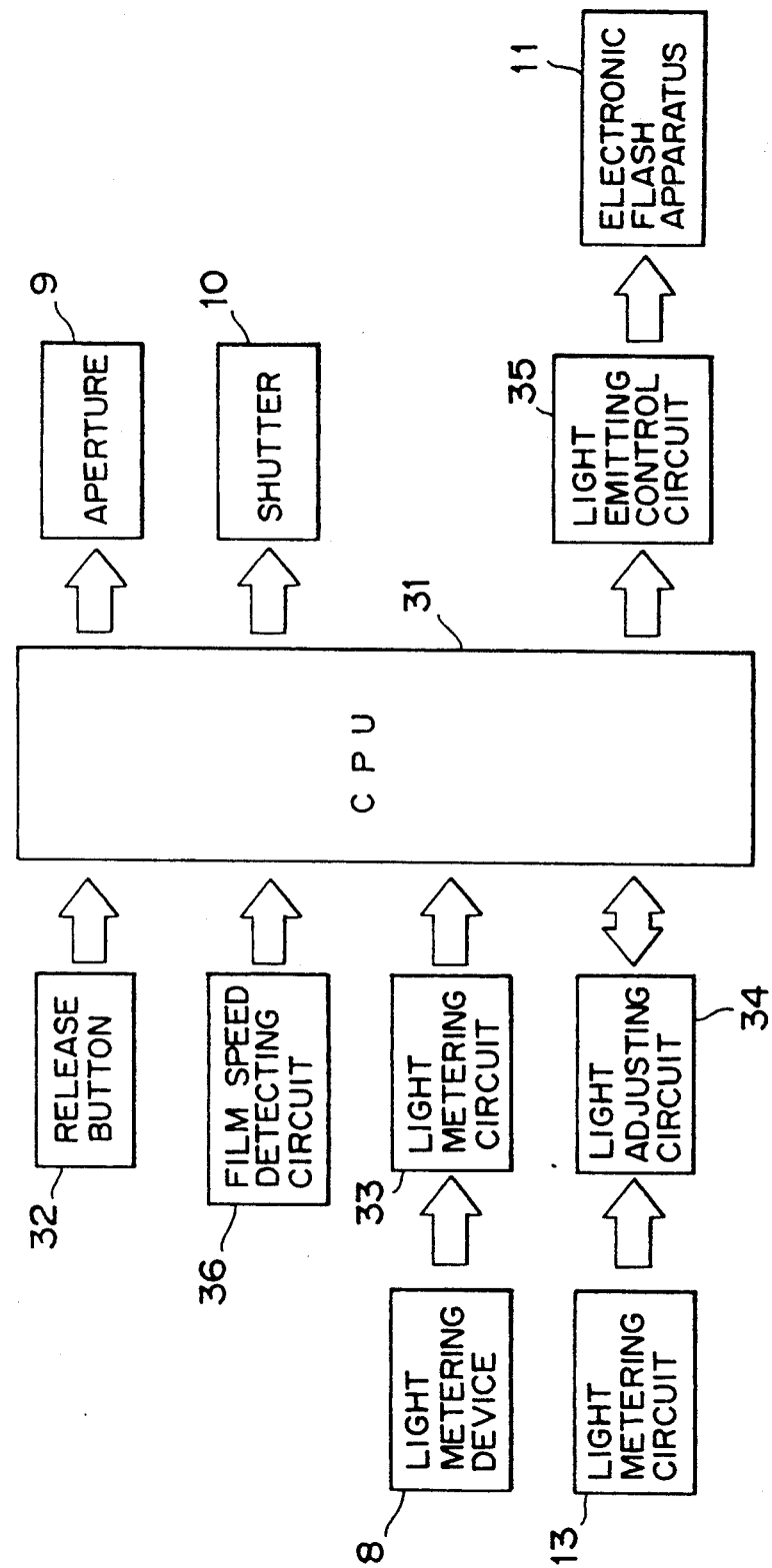

FIG. 4 shows a block diagram of a control unit of the camera.

In FIG. 4, a release button 32 for commanding a start of the shutter release, a film sensitivity detector 36 which detects an ISO sensitivity of the film from a DX code on a film patrone (not shown), a metering circuit 33 and an exposure circuit 34 are connected to a CPU 31 which controls an overall sequence of the camera. The metering device 8 for the steady state light is connected to the metering circuit 33. The metering output of the metering device 8 is logarithmically compressed to convert it to a brightness which is supplied to the CPU 31, which in turn determines an exposure (iris value and shutter speed) based on the input brightness and the detected ISO sensitivity. The metering device 13 for the exposure is connected to the exposure circuit 34 and the metering output of the metering device 13 is integrated with time and the integrated value is supplied to the CPU 31.

The iris 9 and the shutter 10 are also connected to the CPU 31, and a light emission control circuit 35 of the electronic flash device 11 is also connected thereto. The light emission control circuit 35 controls the start and stop of the light emission of the electronic flash device 11 in accordance with a command from the CPU 31.

An operation of the embodiment is now explained with reference to flow charts of FIGS. 5A to 5C and a time chart of FIG. 6.

Figure 5A:
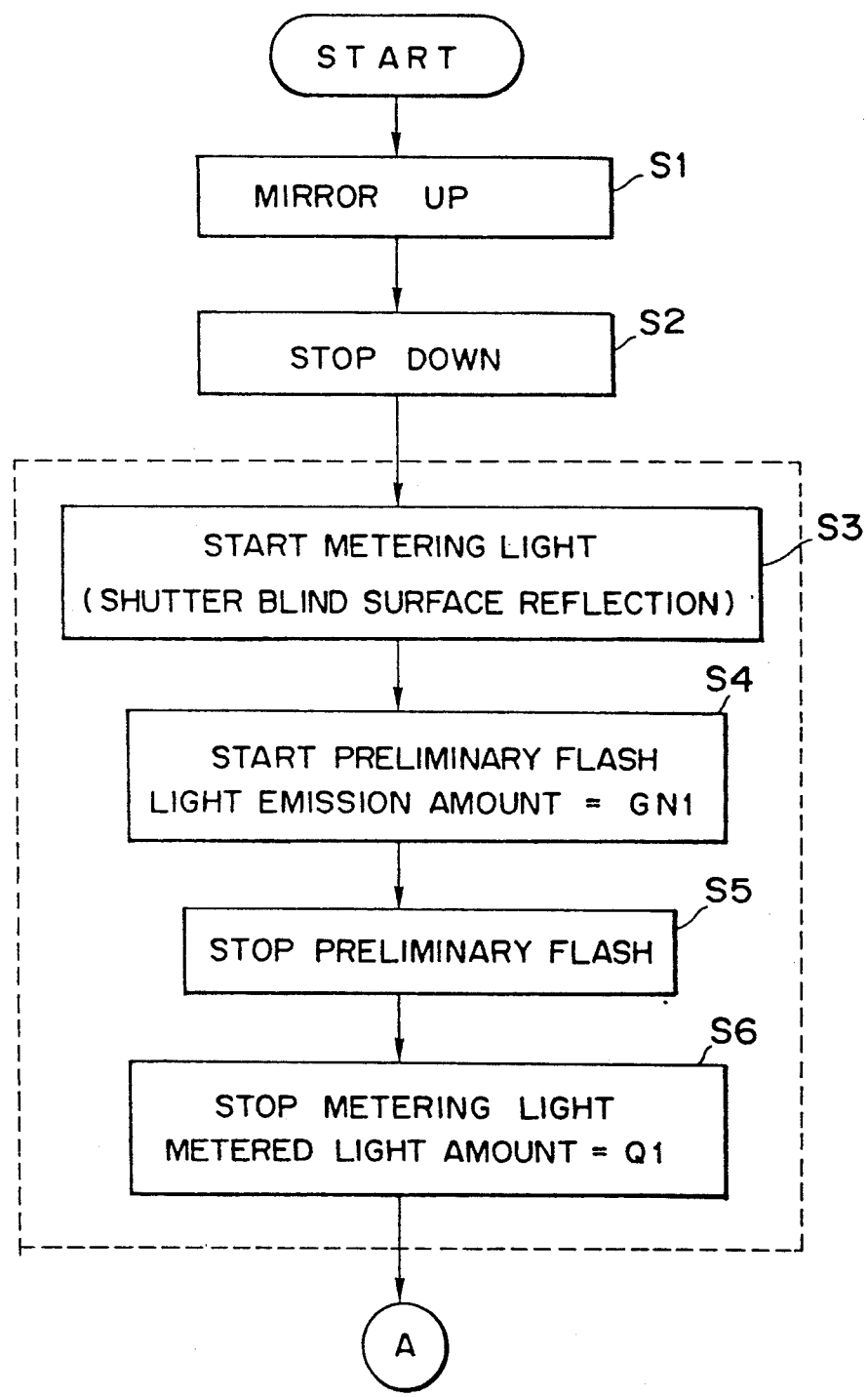
FIGS. 5A to 5C show flow charts of a process.
Figure 5B:
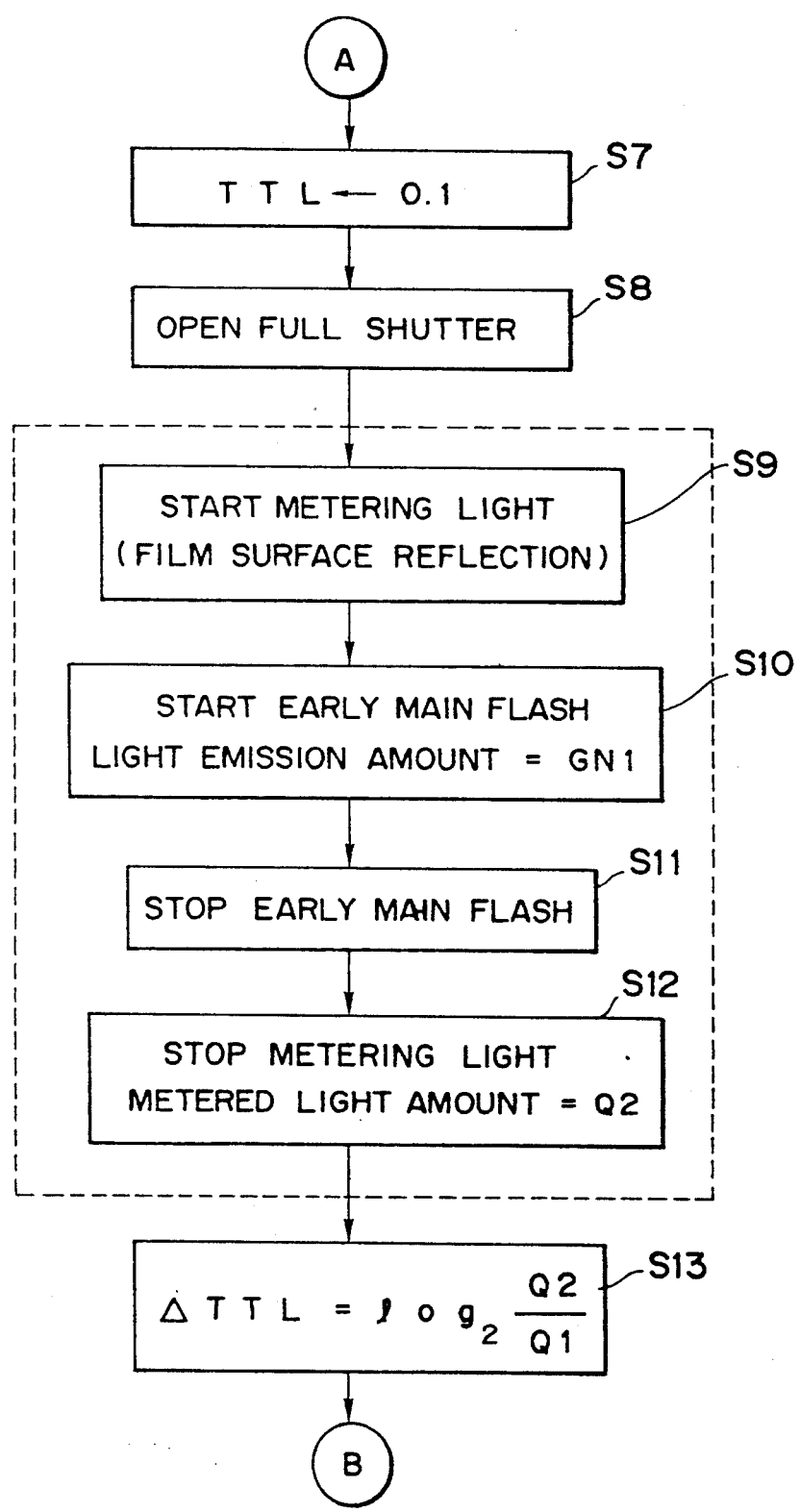
Figure 5C:
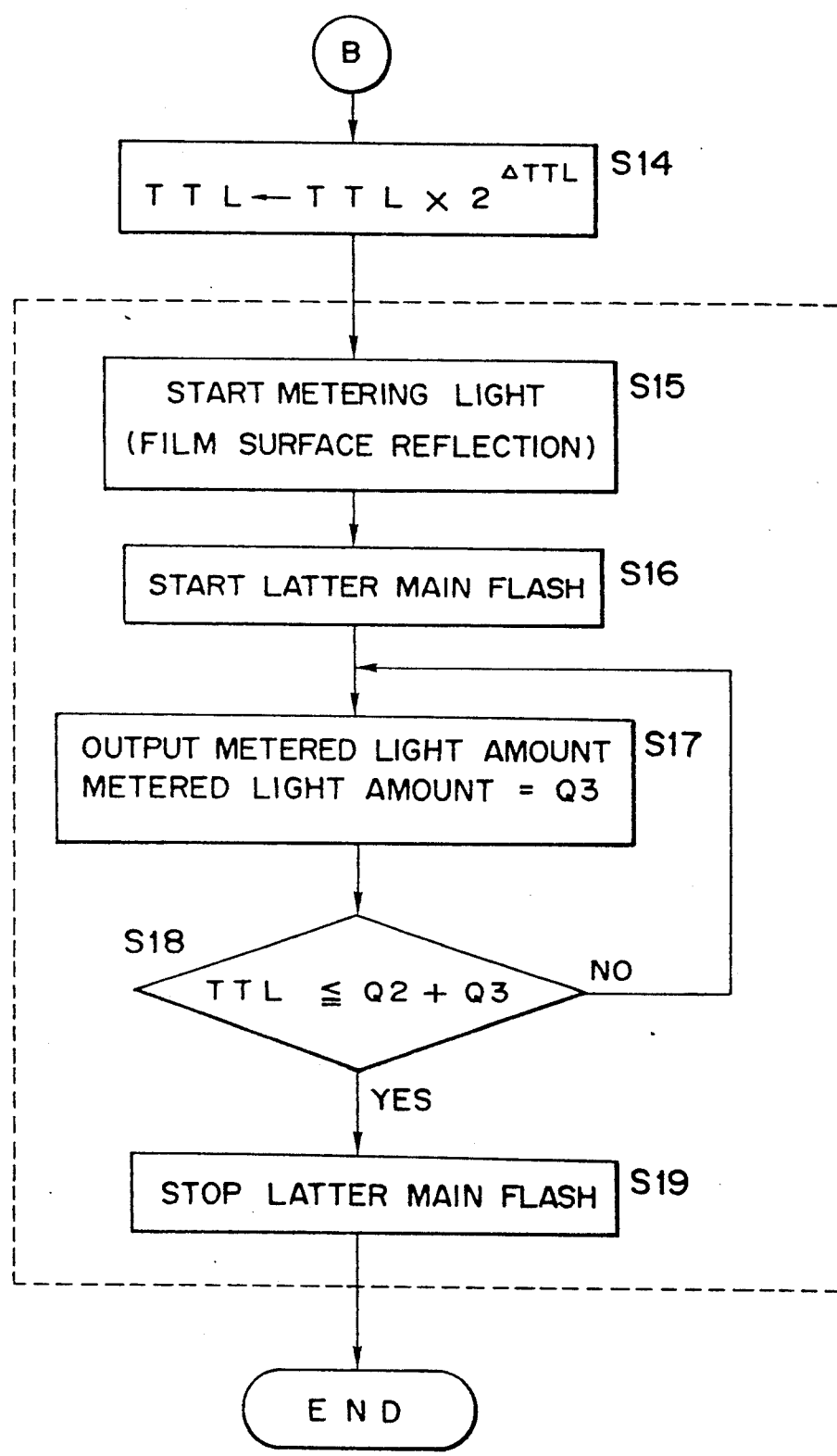
Figure 6:
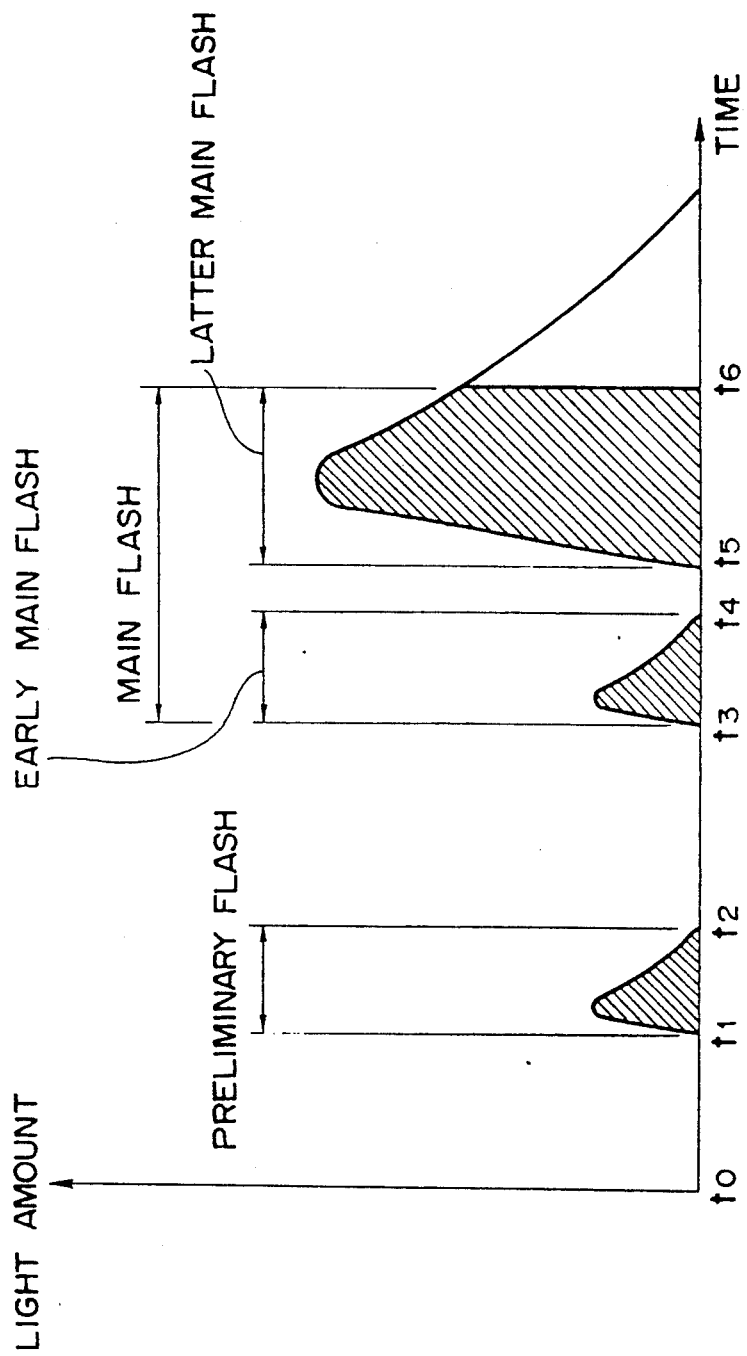

FIGS. 5A to 5C show a control process of the CPU 31. When the release button 32 is depressed, the program is started. In a step S1, the mirror 3 is driven to the up position shown by the solid lines in FIG. 3. In a step S2, the iris 9 is closed to the predetermined position. In a step S3, the exposure circuit 34 is activated to start the metering of the object light (by the metering device 13) reflected by the shutter curtain. In a step S4, the preliminary light emission by the electronic flash device 11 is started at a guide number GN1 through the light emission control circuit 35 (at time t1 in FIG. 6). The reflective index of the shutter curtain is selected to be equal to the reflective index of a reference film.

In a step S5, the preliminary light emission is stopped (at time t2). In a step S6, the metering is stopped and the integration of the metering output of the metering device 13 (obtained from the exposure circuit 34) is inputted as a light intensity Q1. In a step S7, the exposure level is set to 0.1. In a step S8, the shutter curtain is fully opened.

In a step S9, the exposure circuit 34 is again activated to start the metering of the object light (by the metering device 13) reflected by the film surface. In a step S10, the early main light emission at the guide number GN1 (same as the guide number for the preliminary light emission) by the electronic flash device 11 is started through the light emission control circuit 35 (at time t3).

In a step S11, the early main light emission is stopped (at time t4). In a step S12, the metering is stopped and the integration of the metering output of the metering device 13 is inputted as a light intensity Q2. The early main light emission contributes to the exposure to the film.

In a step S13, a ratio ΔTTL of the light intensities Q1 and Q2 are calculated by $$\Delta TTL = \log_2 \frac{Q2}{Q1} \qquad (1)$$

In a step S14, a new TTL level is set by

-continued
$$TTL = TTL \times 2^{\Delta TTL} \quad (2)$$

From the above equation, the light intensities Q1 and Q2 are equal when the reflective index R1 of the shutter curtain surface and the reflective index R2 of the film surface are equal, and in this case the TTL value remains at the initial value 0.1. If R1<R2, then Q1<Q2 and TTL is larger than 0.1. If R1>R2, then Q1>Q2 and TTL is smaller than 0.1.

In a step S15, the exposure circuit 34 is again activated to start the metering of the reflected light from the film surface. In a step S16, the late main light emission by the electronic flash device 11 is started through the light emission control circuit 35 (at time t5).

In a step S17, the integration of the metering output of the metering device 13 is inputted as a light intensity Q3. In a step S18, it is determined whether a sum of the light intensity Q2 by the early main light emission and the light intensity Q3 by the late main light emission reaches the exposure level TTL obtained in the step S14, that is, whether TTL≦Q2+Q3'. If the decision is NO, the process returns to the step S17, and if the decision is YES, a light emission stop signal is issued to the light emission control circuit in a step S19 to stop the late main light emission (at time t6).

In the above process, the light intensity Q1 for the preliminary light emission and the light intensity Q2 for the early main light emission are compared, and the exposure level TTL is determined in accordance with the comparison. In the present embodiment, since the guide numbers for the preliminary light emission and the early main light emission are equal, the light intensities Q1 and Q2 are obtained under the same condition. Accordingly, a correct exposure level is determined from the equations (1) and (2). Since the late main light emission is stopped when the sum of the light intensity Q2 for the early main light emission and the light intensity Q3 for the late main light emission reaches the exposure level TTL, proper exposure is attained without regard to the reflective index of the film surface.

In the present embodiment, the electronic flash device 11 corresponds to the flashing device 101, the CPU 31 and the light emission control circuit 35 correspond to the flashing control unit 102, the exposure control unit 104 and the exposure unit 202 or 302, the metering device 13 and the exposure circuit 34 correspond to the metering unit 103, and the CPU 31 corresponds to the determination unit 201 or 301.

Figure 7A:
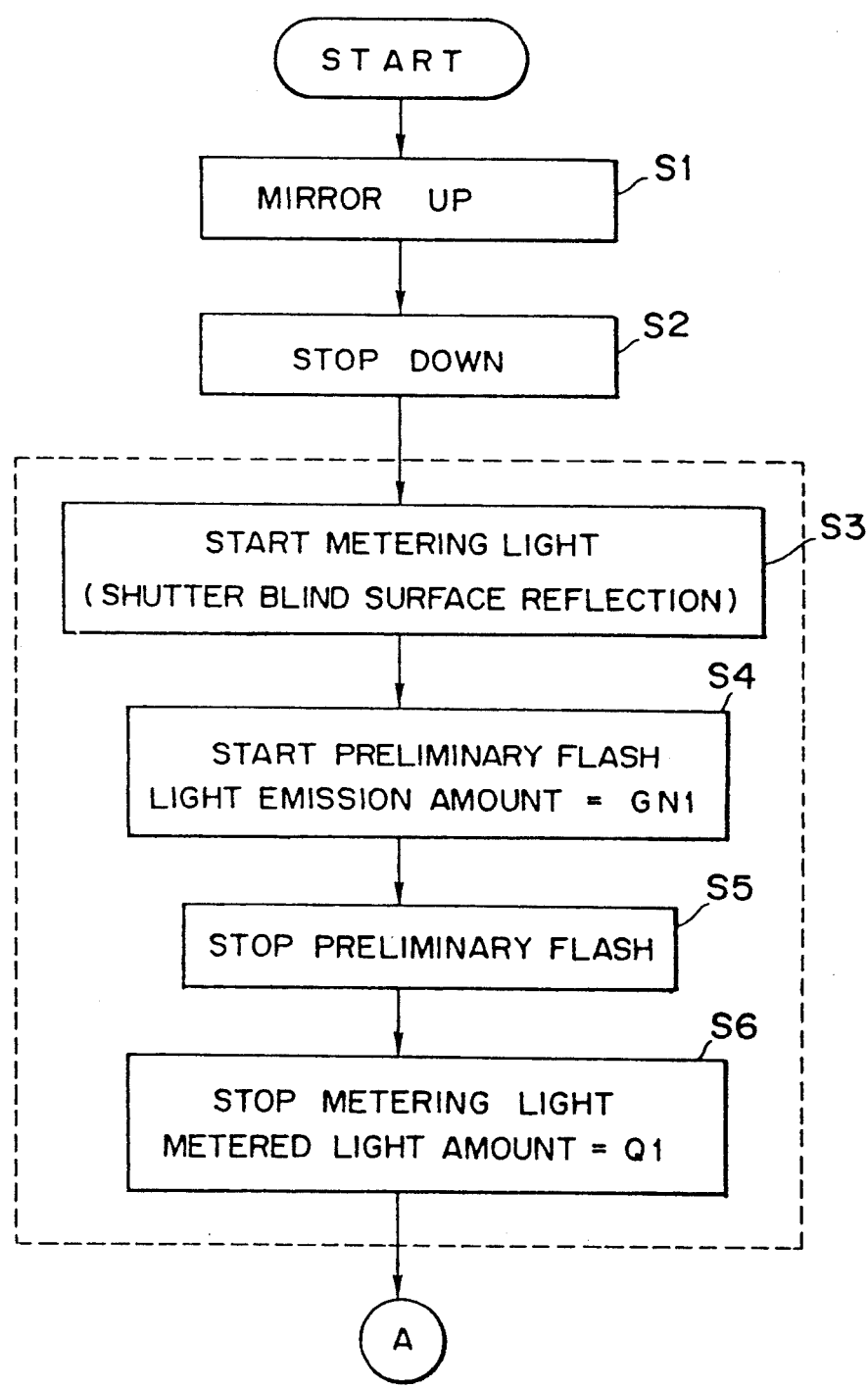
Figure 7B:
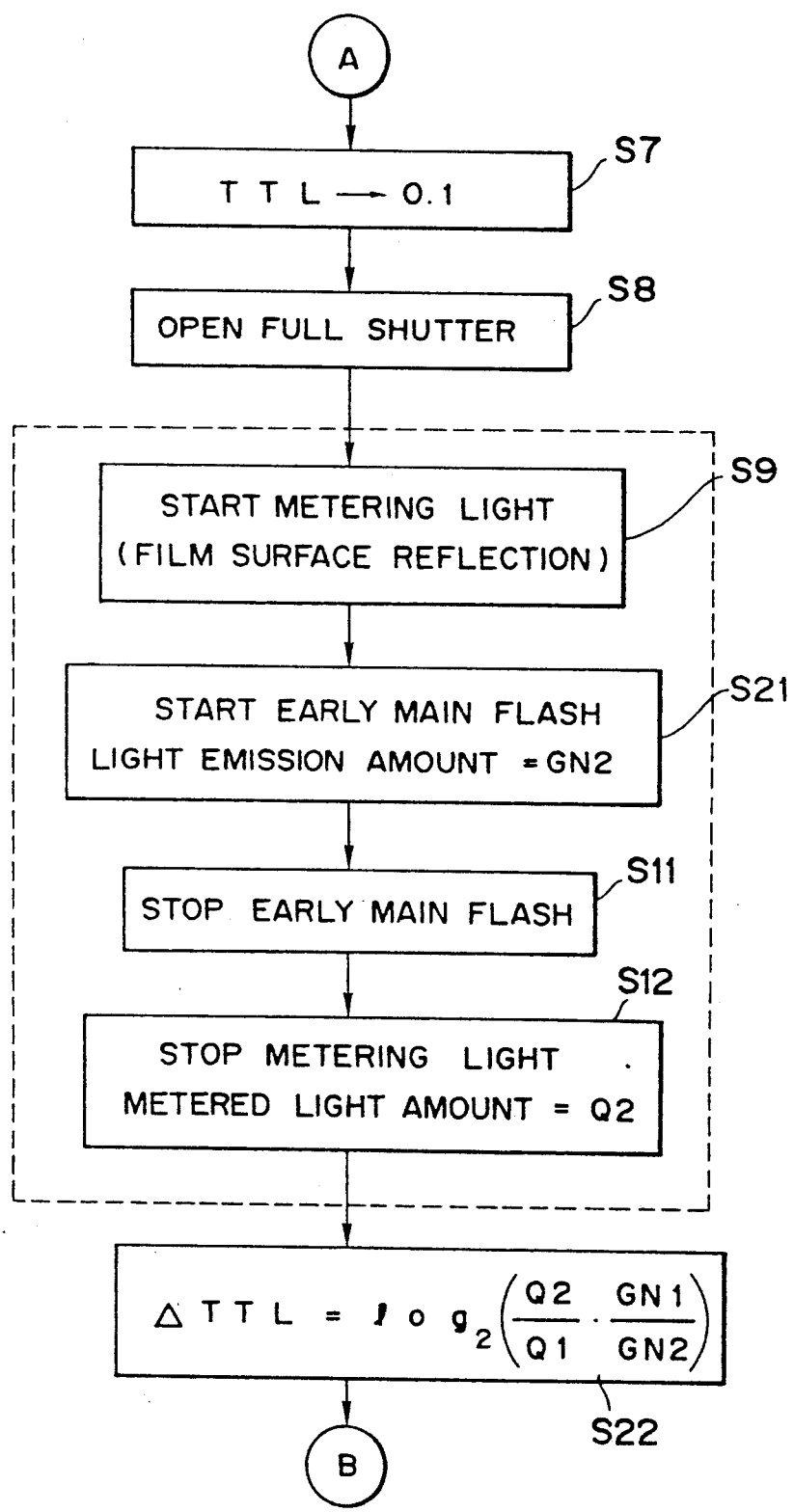

FIGS. 7A to 7C show another embodiment in which the guide number for the preliminary light emission is different from the guide number for the early main light emission. The like steps to those of FIG. 5 are designated by the like step numbers.

In FIGS. 7A to 7C, after the step S9, the early main light emission at the guide number GN2 is started in a step S21. (The guide number for the preliminary light emission is GN1.) In a step S22, ΔTTL is calculated by $$\Delta TTL = \log_2 \left( \frac{Q2}{Q1} \cdot \frac{GN1}{GN2} \right)$$

In the present embodiment, since the guide numbers for the preliminary light emission and the early main light emission are different, a correct exposure level TTL is not obtained of Q1 and Q2 are directly compared. However, since the guide numbers GN1 and GN2 for those light emissions are known, the comparison under the same condition is attained by correcting Q1 and Q2 by GN1 and GN2 as shown in the above equation. Thus, the same effect as that described above is attained in the present embodiment.

In the above embodiments, the exposure level to stop the late main light emission is determined in accordance with the comparison of the metering output for the preliminary light emission and the metering output for the early main light emission. Alternatively, the exposure level may be constant and a gain to correct the sum metering output of the metering output for the early main light emission and the metering output for the late main light emission may be determined in accordance with the comparison. The sum metering output for the both main light emissions is corrected by the above gain in the exposure circuit and the late main light emission is stopped when the corrected sum metering output reaches the above constant exposure level. In this manner, the same effect as that described above is attained.

In accordance with the present invention, the metering output for the preliminary light emission and the metering output for the early main light emission are compared, the exposure condition is determined in accordance with the comparison, and after the start of the late main light emission, the late main light emission is stopped in accordance with the exposure condition. Accordingly, the metering output for the preliminary light emission and the metering output for the early main light emission can be compared under the same condition, and the late main light emission can be stopped at the correct timing without regard to the variation of the reflective index of the film surface. Accordingly, proper exposure is always attained in the flash photographing mode.

Further, in accordance with the present invention, the metering output for the preliminary light emission and the metering output for the early main light emission are compared, the exposure level to stop the late main light emission is determined in accordance with the comparison, and the late main light emission is stopped when the sum metering output of the metering output for the early main light emission and the metering output for the late main light emission reaches the exposure level. Accordingly, the metering output for the preliminary light emission and the metering output for the early main light emission can be compared under the same condition, and the late main light emission can be stopped at the correct timing to achieve the proper exposure without regard to the variation of the reflective index of the film surface Further, in accordance with the present invention, the metering output for the preliminary light emission and the metering output for the early main light emission are compared, the gain to correct the sum metering output of the metering output for the early main light emission and the metering output for the late main light emission is determined in accordance with the comparison, and the late main light emission is stopped when the sum metering output corrected by the determined gain reaches the predetermined exposure level. Accordingly, the metering output for the preliminary light emission and the metering output for the early main light emission can be compared under the same condition and the late main light emission can be stopped at the correct timing to achieve the proper exposure without regard to the variation of the reflective index of the film surface.

What is claimed is:

1. An automatic exposure control apparatus for a camera comprising:
   a flashing means for providing a preliminary light emission, an early main light emission and a late main light emission;
   flashing control means for controlling said flashing means to provide the preliminary light emission in a closed state of a shutter curtain and providing the early main light emission and the late main light emission in sequence after the shutter curtain has been opened;
   metering means for metering a reflected light from the shutter curtain surface at the preliminary light emission and metering a reflected light from a film surface at the early main light emission and the late main light emission; and
   exposure control means for comparing a metering output of said metering means for the preliminary light emission and a metering output of said metering means for the early main light emission, determining an exposure condition in accordance with the comparison, and stopping the late main light exposure in accordance with the exposure condition after the late main light emission has been started.

2. An automatic exposure control apparatus for a camera according to claim 1, wherein a light intensity at the preliminary light emission and a light intensity at the early main light emission are equal.

3. An automatic exposure control apparatus for a camera according to claim 1, wherein a light intensity at the preliminary light emission and a light intensity at the early main light emission are not equal, and said exposure control means corrects the metering output in accordance with the light intensities when the metering outputs are compared.

4. An automatic exposure control apparatus for a camera according to claim 1, wherein said exposure control means corrects a light intensity of the late main light emission to a larger one when a light intensity at the early main light emission is larger than a light intensity at the preliminary light emission by more than a predetermined amount.

5. An automatic exposure control apparatus for a camera according to claim 1, wherein said exposure control means corrects a light intensity of the late main light emission to a smaller one when a light intensity at the early main light emission is smaller than a light intensity at the preliminary light emission by more than a predetermined amount.

6. An automatic exposure control apparatus for a camera according to claim 1, wherein said exposure control means compares a light intensity at the preliminary light emission and a light intensity at the early main light emission to detect a factor relating to a reflective index of the film.

7. An automatic exposure control apparatus for a camera comprising:
   a flashing means for providing a preliminary light emission, an early main light emission and a late main light emission;
   flashing control means for controlling said flashing means to provide the preliminary light emission in a closed state of a shutter curtain and providing the early main light emission and the late main light emission in sequence after the shutter curtain has been opened;
   metering means for metering a reflected light from the shutter curtain surface at the preliminary light emission and metering a reflected light from a film surface at the early main light emission and the late main light emission;
   determination means for comparing a metering output of said metering means for the preliminary light emission and a metering output of said metering means for the early main light emission and determining an exposure level to stop the late main light emission in accordance with the comparison; and
   exposure means for stopping the late main light emission after the start of the late main light emission when a sum metering output of the metering output for the early main light emission and the metering output for the late main light emission reaches the determined exposure level.

8. An automatic exposure control apparatus for a camera comprising:
   a flashing means for providing a preliminary light emission, an early main light emission and a late main light emission;
   flashing control means for controlling said flashing means to provide the preliminary light emission in a closed state of a shutter curtain and providing the early main light emission and the late main light emission in sequence after the shutter curtain has been opened;
   metering means for metering a reflected light from the shutter curtain surface at the preliminary light emission and metering a reflected light from a film surface at the early main light emission and the late main light emission;
   determination means for comparing a metering output of said metering means for the preliminary light emission and a metering output of said metering means for the early main light emission and determining a gain to correct a sum metering output of the metering output for the early main light emission and the metering output for the late main light emission in accordance with the comparison; and
   exposure means for stopping the late main light emission after the start of the late main light emission when the sum metering output corrected by the determined gain reaches a predetermined exposure level.

9. An automatic exposure control apparatus for a camera, comprising:
   release means for initiation an operation of the camera to expose a film;
   flashing means for providing a preliminary light emission and a main light emission;
   flashing control means for controlling said flashing means to provide the preliminary light emission in a closed state of a shutter curtain during one stage of said operation and providing the main light emission after the shutter curtain has been opened during a subsequent stage of said operation;
   metering means for metering a reflected light from a reflection member of a known reflective index at the preliminary light emission and metering a reflected light from a film surface at the main light emission; and
   means for comparing metered light at the preliminary light emission and metered light at the main light emission to detect a factor relating to a reflective index of the film.

* * * * *